United States Patent
Nudelman et al.

[11] 3,926,974
[45] Dec. 16, 1975

[54] CEPHALOSPORIN DERIVATIVES

[75] Inventors: Abraham Nudelman, Bala Cynwyd; Ronald J. McCaully, Malvern, both of Pa.

[73] Assignee: American Home Products Corporation, New York, N.Y.

[22] Filed: May 24, 1973

[21] Appl. No.: 363,469

[52] U.S. Cl............ 260/243 C; 260/239.1; 424/271; 424/246
[51] Int. Cl.² .................................. C07D 501/20
[58] Field of Search ................. 260/243 C

[56] References Cited
UNITED STATES PATENTS
3,673,183   6/1972   Erickson ................. 260/243 C Primary Examiner—Nicholas S. Rizzo
Attorney, Agent, or Firm—Stephen Venetianer

[57] ABSTRACT

This disclosure is directed to novel derivatives of 6-aminopenicillanic and 7-aminocephalosporanic acids having the following structural formulae:

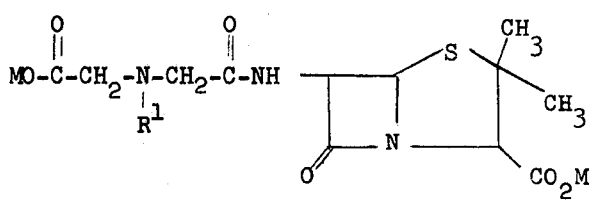

and

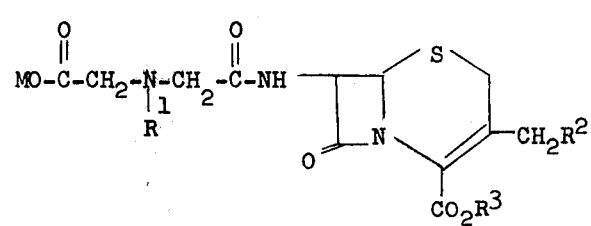

wherein M, $R^1$, $R^2$ and $R^3$ are defined herein. These compounds have been found to possess useful antibacterial properties.

3 Claims, No Drawings

CEPHALOSPORIN DERIVATIVES

BACKGROUND OF THE INVENTION

Field of the Invention

This invention relates to derivatives of 6-aminopenicillanic acid (6-APA) and 7-aminocephalosporanic acid (7-ACA). More particularly, this invention relates to amino acid derivatives of 6-APA and 7-ACA.

Summary of the Invention

This invention relates to novel compounds represented by the following structural formulae:

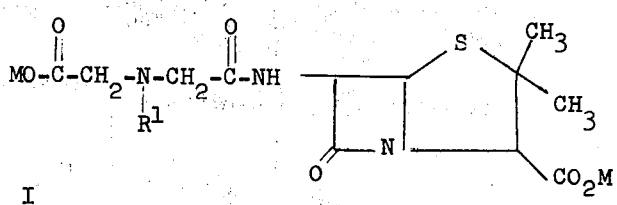

I

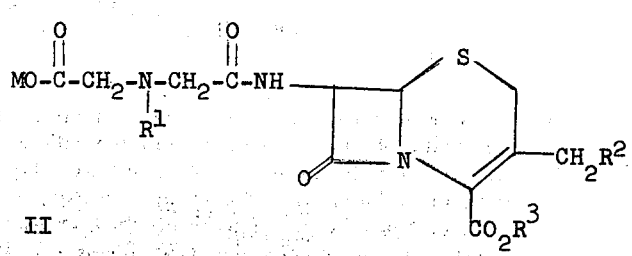

II wherein M is hydrogen or a pharmaceutically acceptable cation;

$R^1$ is a (lower)alkyl or aryl group;

$R^2$ is hydrogen, hydroxyl, (lower)alkanoyloxy, benzoyloxy, or a quaternary ammonium cation;

$R^3$ is hydrogen, or a pharmaceutically acceptable cation.

It is to be noted that when $R^2$ is a quaternary ammonium cation $R^3$ is an anionic charge. Alternately, $R^2$ and $R^3$ may be taken together as a monovalent carbon to oxygen bond.

Description of the Invention

As used herein the term "(lower)alkyl" means a straight or branched chain hydrocarbon radical having from one to six carbon atoms. Illustrative of "(lower)alkyl" is methyl, ethyl, isopropyl, butyl, sec-butyl and hexyl. The term "aryl" includes phenyl and naphthyl. The term "(lower)alkanoyloxy" includes the acetoxy group. Illustrative of the term quaternary ammonium cation is pyridinyl.

The preferred compounds of the present invention are represented by the formulae I and II wherein M is hydrogen, $R^1$ is alkyl, $R^2$ is hydrogen or acetoxy and $R^3$ is hydrogen.

The compounds of the present invention are prepared in the following manner:

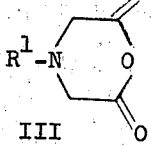

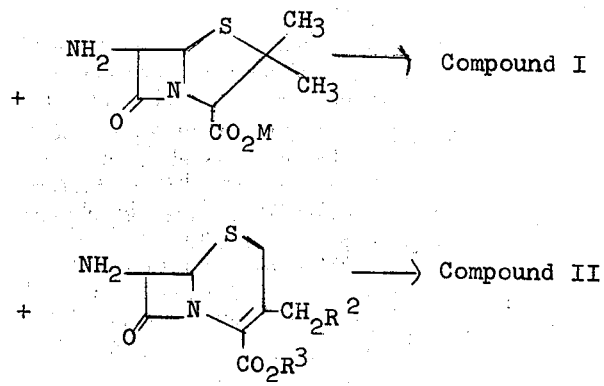

Compounds of Formula III are prepared by a known literature procedure [D. W. Henry, J. Het. Chem., 3, 503 (1966)]. Suitable solvents include dimethyl formamide and dimethyl acetamide.

or

As will be understood by those skilled in the art, the compounds of Formula I and II may be utilized in their acid form or in the form of their therapeutically-active salts thereof, e.g., the sodium or potassium salts, or in the form of the pharmaceutically acceptable salts prepared by the reaction of the penicillin or cephalosporin compounds with an amine, a trialkylamine, or diamine base, e.g., triethylamine, procaine or various N-N'-disubstituted alkylene diamines, such as N,N'-dibenzyl-ethylene-diamine, etc. Additionally, the compounds of Formula I and II may be utilized in their hydrated form.

The new compounds of the series defined above show desirable broad spectrum anti-bacterial activity and are useful as therapeutic agents for poultry and mammals in the treatment of infectious diseases caused by gram-positive and gram-negative bacteria by either parenteral or oral administration, particularly strains of Staphylococcus aureus. Additionally, the compounds of this invention exhibit useful activity against tubercle bacilli.

As will also be understood by those skilled in the art, the compounds of the invention may be utilized in suitable dosage form, including solutions, suspensions, tablets, capsules, and the like.

The following examples are illustrative of the invention.

EXAMPLE 1

7-(2-[(Carboxymethyl)methylamino]acetamido)cephalosporanic acid

A solution containing 7-aminocephalosporanic acid (1.36 g, 5 mmoles) and N-methyliminodiacetic acid anhydride (0.65 g, 5 mmoles) in 20 ml of dimethyl formamide is stirred at room temperature for 45 min. The solvent is then flash evaporated at 25° to give a semi-solid residue that crystallizes when mixed with ether. The title compound is obtained upon filtration as a white solid that decomposes above 80°C, 1.8 g (82.5% yield); nmr (DMSO-$D_6$) ppm δ: 2.03 (s, 3), 2.47 (s, 3), 3.48 (broad s,4), 3.63 (broad s, 2); 4.90 (d, 2), 5.20 (d, 1), 5.82 (d, 1), 0.5 mole of dimethylformamide is observed at 2.79 (s, 3), 2.94, (s, 3), 8.0 (broad s, 1).

Anal. Calcd for $C_{15}H_{19}N_3O_8S·½C_3H_7NO$: C,45.25; H, 5.18;N, 11.19; S, 7.32. Found: C,45.08; H, 5.64;N, 10.68; S, 6.94.

EXAMPLE 2

7-(2[(Carboxymethyl)methylamino]acetamido)-3-methyl-8-oxo-5-thia 1-azabicyclo[4.2.0]oct-2-ene-2-carboxylic acid The title compound is obtained by a procedure similar to that employed in Example 1 by reacting N-methyliminodiacetic acid anhydride with 7-aminodesacetoxy cephalosporanic acid in dimethyl acetamide.

EXAMPLE 3

6-(2-[(Carboxymethyl)methylamino]acetamido)-penicillanic acid

The title compound is obtained in 85% yield by a similar procedure as that described in Example 1 from 6-amino-penicillanic acid 2.16 g (10 mmoles) and N-methyliminodiacetic acid anhydride (1.29 g, 10 mmoles). The product obtained as a white crystalline powder decomposes above 150°C; nmr (DMSO-$D_6$), ppm (δ) 1.50 (s, 3), 1.62 (s, 3), 2.41 (s, 3), 3.36 (s, 2), 3.42 (s, 2), 4.38 (s, 1), 5.60 (d, 1), 5.65 (d, 1), 0.5 mole of dimethyl formamide is observed at 2.79 (s, 3), 2.94 (s, 3), 8.0 (broad s, 1).

Anal. Calcd for $C_{13}H_{19}N_3O_6S·½C_3H_7NO$: C, 45.60; H, 5.93; N, 12.84; S, 8.40 Found: C, 45.34; H, 6.07; N, 11.87; S, 8.63.

The compounds of formula I and II of this invention have been found to possess antibacterial activity. Antibacterial screening is carried out by an agar serial dilution technique. Distilled water is used as a vehicle. The stock solution is prepared at 10,000μg./ml. of substance in the vehicle. Two-fold dilutions are made with sterile water. One ml. quantities of each dilution are incorporated into 9 ml. seed agar in sterile petrie dishes. The hardened surface is inoculated with test organisms and incubated 18 hours at 35°C. The end point is reported as a minimal inhibitory concentration (MIC) expressed in μg./ml.; the least amount of test substance that will completely inhibit the test organism. The compound of Example 1 when tested against *Bacillus subtillus* produced a MIC value of 3.90 μg./ml and when tested against *Staphylococcus aureus* 6538P and *Staphylococcus aureus Smith* produced a MIC value of 7.81 μg/ml. The compound of Example 2 produced a MIC value of 7.81 μg/ml against *Bacillus subtillus* and *Staphylococcus aureus* 6538P and a MIC value of 15.6 μg/ml against *Staphylococcus aureus Smith*.

Antitubercular screening is carried out by a tube dilution technique. A stock solution of 1000 μg/ml is prepared in a suitable vehicle such as dimethyl acetamide. 1.0 ml quantities of each ensuing dilution is incorporated into 9 ml of medium to give a final concentration of .01 to 100 μg/ml. Tubes are seeded with 0.1 ml of standardized bacterial suspension and incubated for two weeks at 37°C. Dubos oleic acid liquid is used as the medium. Stock cultures are maintained on Dorset Egg Agar. The standard employed is isonicotinic acid hydrazide. The compound of Example 1, employing this technique, was shown to possess useful activity against *tubercle bacilli* specifically, the human type of strain H37 Rv. at a level of 10 μg/ml.

What is claimed is:

1. A compound selected from the group consisting of

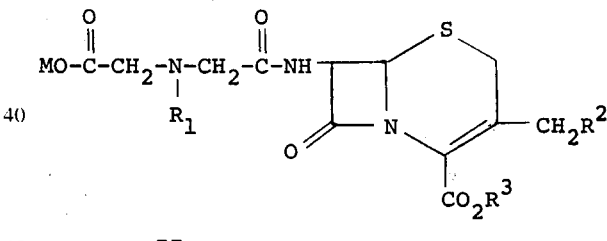

II wherein M is selected from the group consisting of hydrogen and a pharmaceutically acceptable cation;

$R^1$ is selected from the group consisting of lower alkyl, phenyl and naphthyl;

$R^2$ is selected from the group consisting of hydrogen, hydroxyl, (lower)alkanoyloxy, benzoyloxy, and pyridinyl $R^3$ is selected from the group consisting of hydrogen and a pharmaceutically acceptable cation.

2. A compound according to claim 1 wherein the compound is 7-(2-[(carboxymethyl)methylamino]acetamido) cephalosporanic acid.

3. A compound according to claim 1 wherein M is hydrogen, $R^1$ is lower alkyl, $R^2$ is hydrogen or acetoxy and $R^3$ is hydrogen.

* * * * *